United States Patent [19]

Mongoin et al.

[11] Patent Number: 5,109,090
[45] Date of Patent: Apr. 28, 1992

[54] COMPATIBILITY AGENT FOR AQUEOUS POLYPIGMENTARY SUSPENSIONS CONTAINING HYDRATED CALCIUM SULFATE

[75] Inventors: Jacques Mongoin, Champagne Au Mont d'Or; Georges Ravet, Saint Genis les Ollieres; Jean-Marc Suau, Lyons, all of France

[73] Assignee: Coatex S.A., Caluire, France

[21] Appl. No.: 418,869

[22] Filed: Oct. 10, 1989

[30] Foreign Application Priority Data

Oct. 10, 1988 [FR] France ................. 88 13511

[51] Int. Cl.$^5$ .............. C09C 1/02; C01F 11/46; C08F 230/02
[52] U.S. Cl. ............... 526/278; 523/333; 524/425; 526/212; 106/487
[58] Field of Search ............. 526/278, 212; 524/425; 523/333; 106/300, 333, 487

[56] References Cited

U.S. PATENT DOCUMENTS

| | | | |
|---|---|---|---|
| 2,284,585 | 5/1942 | McCleary et al. | 106/300 |
| 4,450,013 | 5/1984 | Hirsch et al. | 106/308 |
| 4,774,303 | 9/1988 | Denzinger et al. | 526/212 |
| 4,842,651 | 6/1989 | Ravet et al. | 106/487 |
| 4,868,228 | 9/1989 | Gonnet et al. | 523/333 |

FOREIGN PATENT DOCUMENTS 8802382  4/1988
57-110329  7/1982  Japan .

Primary Examiner—Paul R. Michl
Assistant Examiner—T. McDonald, Jr.
Attorney, Agent, or Firm—Oblon, Spivak, McClelland, Maier & Neustadt

[57] ABSTRACT

Copolymers having the general formula:

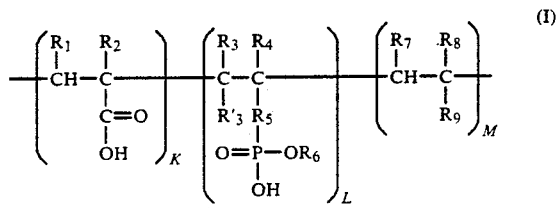

are useful as compatibility, dispersion and grinding agents for aqueous pigmentary suspensions formulated from a mixture of mineral pigments, at least one of which is hydrated calcium sulfate. These suspensions are useful in papermaking.

9 Claims, No Drawings

COMPATIBILITY AGENT FOR AQUEOUS POLYPIGMENTARY SUSPENSIONS CONTAINING HYDRATED CALCIUM SULFATE

BACKGROUND OF THE INVENTION

1. Field of the Invention

The present invention relates to a compatibility, dispersion and/or grinding agent for aqueous pigmentary suspensions formulated from a mixture of mineral pigments, at least one of which is hydrated calcium sulfate. The invention also relates to aqueous pigmentary suspensions containing the dispersion and/or grinding agent formulated from a mixture of pigments, at least one of which is hydrated calcium sulfate, a method for preparing such suspensions, a method of papermaking, using the above-identified aqueous pigmentary suspensions, and the paper made by such a process.

2. Background of the invention

When aqueous pigmentary suspensions are prepared from a mixture of mineral pigments, there frequently occurs an extremely rapid and considerable increase in their viscosity, which can reach the solidification point of said suspensions.

This phenomenon, which is linked to the incompatibility of the pigments with one another, occurs for example in suspensions containing a mixture of $CaCO_3$ and titanium oxide, $CaCO_3$ and kaolin, and $CaCO_3$ and titanium oxide and kaolin.

Known to the skilled artisan by the term "shock effect", this viscosifying effect also occurs, but to a greater extent, in the case of aqueous pigmentary suspensions containing both hydrated calcium sulfate and calcium carbonate, or even hydrated calcium sulfate, kaolin and calcium carbonate.

Hydrated calcium sulfate is a mineral pigment which has not yet been greatly exploited as such, but possesses interesting qualities in the field of mass charge or coating of the paper with a view to improving the opacity, shine, reaction to water, printing and whiteness thereof (Patents FR 2,370,124; FR 2,343,082; FR 2,440,437; FI 67.568).

In addition, for the satisfactory use of aqueous pigmentary suspensions formulated from a mixture of mineral pigments, at least one of which is hydrated calcium sulfate, it is desirable to be able to use an agent which is capable of both promoting the dispersion of the pigmentary particles and of eliminating the shock effect by rendering the pigments compatible with one another.

For many years the specialized literature has discussed the research carried out to eliminate the shock effect occurring between the hydrated calcium sulfate and other pigments when they are used together in aqueous pigmentary suspensions.

A first reference (EP 0 216 516) describes a compatibility agent which enables the preparation of aqueous suspensions containing as pigments a mixture of gypsum (in which 70% of the particles have a size of less than 2 microns), kaolin (in which 80% of the particles have a size of less than 2 microns) and calcium carbonate (in which 86% of the particles have a size of less than 2 microns). The recommended compatibility agent is formed from an alkylphosphate ester or a polyacrylate, in which at least 15% of the carboxylic sites are esterified.

In this manner, aqueous suspensions containing a mixture of hydrated calcium sulfate and calcium carbonate or kaolin were prepared in the presence of the above-identified compatibility agent, whether it be an alkylphosphate ester or a partially esterified polyacrylate. However, in order to achieve reasonable viscosities for industrial use, the concentration of these suspensions was unable to go beyond 56% by weight of dry material.

In addition and in the case of the use of an alkylphosphate ester as the compatibility agent, there appears a new restriction of having to operate in a medium with a pH of at most equal to 7 in order for the rheology of the pigmentary suspension to remain within acceptable values for the applications planned. Moreover, when the pH exceeds 7, it is no longer possible to control the viscosity of the mixture of pigments in suspension, with this viscosity increasing very rapidly in a detrimental manner.

Therefore, as the aqueous pigmentary suspensions for the coating of the paper must normally have a concentration of dry material of at least 65% and a pH of between 8 and 11, the compatibility agent recommended in said patent is unusable in the field of paper coating.

In EP 0 227 623, a compatibility agent is proposed which is selected from the acid alkylamine salts in order to regulate the viscosity of aqueous pigmentary suspensions intended for paper coating and containing a mixture of calcium sulfate, kaolin and/or calcium carbonate. However, it has not been possible to bring the content of dry material of these suspensions to a value greater than 56% by weight without causing an increase in viscosity which is prohibitive for paper coating applications.

FR 2,370,124 discloses the use of a compatibility agent to stabilize aqueous pigmentary suspensions intended for paper coating and containing a mixture of aluminum trihydroxide and dihydrated calcium sulfate with a grain size of less than 20 micrometers, with said pigment compatibility agent being a phosphate-ester of depolymerized starch, possibly in combination with a conventional dispersion agent.

However, such pigmentary compositions can be used in the paper coating field only if the user is satisfied with a low content of dry material (on the order of 50% by weight) in order to control the rheology, which fact is certainly a disadvantage.

GB 2,173,781 discloses, for the manufacture of a hydrated calcium sulfate slurry, to use as a dispersing agent a mixture of a surfactant agent with a high concentration, selected from the group of organic sulfates or sulfonates, and a complexing agent selected from the inorganic phosphates and the amines. However, as the present applicants have found, such a mixture of surfactant and complexing agents does not enable the compatibility sought between the hydrated calcium sulfate and the other pigments normally used for paper coating to be achieved.

SUMMARY OF THE INVENTION

Therefore, a first object of the present invention is to provide a compatibility agent which eliminates the previously mentioned shock effect and renders possible the simultaneous presence of hydrated calcium sulfate and other pigments in aqueous pigmentary suspensions without causing the increase in viscosity which is normally observed.

Another object of the present invention is to provide a compatibility agent which eliminates the shock effect and which is also an effective grinding-agent for the refinement of coarse hydrated calcium sulfate, alone or in a mixture with other mineral materials.

Another object of the present invention is to provide aqueous pigmentary suspensions which are more concentrated than in the prior art and which are prepared from mixtures of mineral pigments at least one of which is hydrated calcium sulfate.

Another object of the present invention is to provide a method for preparing aqueous pigmentary suspensions which contain hydrated calcium sulfate.

Another object of the present invention is to provide a method of papermaking using aqueous pigmentary suspensions containing hydrated calcium sulfate.

Another object of the present invention is to provide paper made by a process using aqueous pigmentary suspensions containing hydrated calcium sulfate.

These and other objects, which will become apparent during the course of the following detailed description, have been achieved by the inventors' discovery that copolymers having the general formula (I):

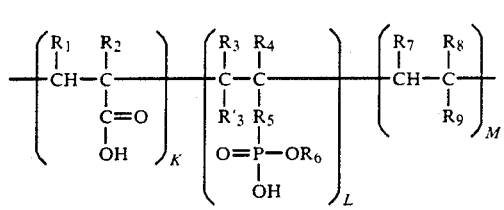

symbolized by the formula: $+A+_K+B+_L+C+_M$ wherein (B) is an ethylene monomer having a phosphate or phosphonate function, (A) is an ethylene monomer having a carboxylic acid group, and (C) is an ethylene monomer of the ester or substituted type, and wherein L is a value such that (B) is present in an amount of between 5 and 95 parts by weight, based on the sum of the amounts of (A), (B), and (C), and one of K and M may be 0, are effective compatibility, dispersion, and grinding agents for pigmentary suspensions which contain hydrated calcium sulfate and which may be used in papermaking.

DETAILED DESCRIPTION OF THE PREFERRED EMBODIMENTS

Thus, while the previous reports basically describe compatibility or dispersion agents resulting from mixtures of known products, the agent in accordance with the present invention is distinguished by the fact that it concentrates, due to a single molecular structure, all the functions peculiar to creating interpigmentary effects of compatibility and permitting the dispersion and the grinding of pigments, at least one of which is calcium sulfate.

In addition, whereas the prior art reveals only the placing in suspension of a mixture of pigments containing coarse hydrated calcium sulfate at concentrations not exceeding 56% by weight of dry material, the agent in accordance with the present invention gives rise to a synergistic effect simultaneously providing the refinement and the acquisition of the interpigmentary compatibility effect at concentrations greater than those of the prior art, while favorably controlling the rheology of the suspensions for the papermaking industry.

In the above-given formula of the agent in accordance with the invention, $R_1$ can be hydrogen or a carboxylic acid group, which may or may not be esterified with a $C_1$ to $C_{12}$, preferably $C_1$ to $C_3$, alcohol.

$R_2$ can be hydrogen or a $C_1$ to $C_{12}$, preferably $C_1$ to $C_3$, alkyl group.

$R_3$ and $R'_3$ can be hydrogen, a $C_1$ to $C_{12}$, preferably $C_1$ to $C_3$, alkyl group, a substituted or an unsubstituted aryl, a carboxylic acid group, or a halogen.

$R_4$ can be hydrogen, a $C_1$ to $C_{12}$, preferably $C_1$ to $C_3$, alkyl group, a substituted or an unsubstituted aryl, or a carboxylic acid group which may or may not be esterified with a $C_1$ to $C_{12}$, preferably $C_1$ to $C_3$, alcohol.

$R_5$ is a group of atoms binding the phosphorus to the polymeric chain by a phosphate function

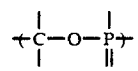

or by a phosphonate function

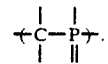

Where the function is of the phosphate type, $R_5$ can be:

either an ethylene oxide or a propylene oxide carboxylic ester of the formula:

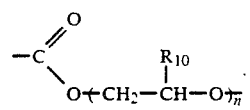

in which $R_{10}$ can be hydrogen or a methyl group and n can take on values in the range of 1 to 50, preferably 1 to 10;

an alkyl, aryl or aralkyl carboxylic ester of the formula:

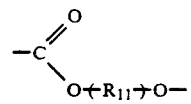

in which $R_{11}$ can contain 1 to 12 carbon atoms;

a substituted amide of the formula:

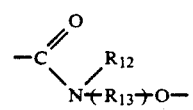

in which $R_{12}$ is hydrogen, $C_1$ to $C_{12}$, preferably $C_1$ to $C_3$, alkyl, a substituted or unsubstituted $C_5$ or $C_6$ aryl group, or an aralkyl group, and $R_{13}$ can be $C_1$ to $C_{12}$, preferably $C_1$ to $C_3$, alkyl, substituted or unsubstituted $C_5$ or $C_6$ cycloalkyl, such as cyclohexyl and cyclopentyl, $C_5$ or $C_6$ cycloalkenyl, such as cyclopentadienyl, aryl, such as phenyl or aralkyl; or oxygen.

In the case where the function is of the phosphonate type, $R_5$ can be $C_1$ to $C_{12}$, preferably $C_1$ to $C_3$, alkyl, substituted or unsubstituted $C_5$ to $C_6$ cycloalkyl, substituted or unsubstituted $C_5$ to $C_6$ cycloalkenyl, substituted or unsubstituted aryl, aralkyl, a $C_1$ to $C_{12}$, preferably a $C_1$ to $C_3$, ester, or a substituted amide.

$R_6$ can be hydrogen, a cation, an ammonium group, an amine, $C_1$ to $C_3$ alkyl, substituted or unsubstituted $C_5$ or $C_6$ cycloalkyl, substituted or unsubstituted $C_5$ to $C_6$ cycloalkenyl, substituted or unsubstituted aryl, aralkyl, a $C_1$ to $C_{12}$, preferably $C_1$ to $C_3$, ester, or a substituted amide.

$R_7$ can be hydrogen, a carboxylic group, a $C_1$ to $C_{12}$, preferably $C_1$ to $C_3$, ester, $C_1$ to $C_{12}$, preferably $C_1$ to $C_3$, alkyl, $C_5$ or $C_6$ cycloalkyl, $C_5$ or $C_6$ cycloalkenyl, aryl, or aralkyl.

$R_8$ can be hydrogen, a carboxylic group, $C_1$ to $C_3$ alkyl, or a halogen.

$R_9$ can be a $C_1$ to $C_{12}$, preferably $C_1$ to $C_5$, ester, a substituted or an unsubstituted amide, $C_1$ to $C_{12}$, preferably $C_1$ to $C_3$, alkyl, $C_5$ or $C_6$ cycloalkyl, $C_5$ or $C_6$ cycloalkenyl, aryl, aralkyl, a halogen, a carboxylic group, or a sulfonated or sulfated alkyl or aryl group.

These acid copolymers may be prepared by copolymerization in accordance with conventional methods, in the presence of appropriate initiators and regulators, in an aqueous, alcoholic, hydroalcoholic, aromatic or aliphatic medium or in a halogenated solvent, of at least two ethylenically unsaturated monomers one of which has a phosphate or phosphonate function, at atmospheric or over pressure. That is, the present copolymers may be prepared by the copolymerization of an ethylenically unsaturated monomer corresponding to unit (B) in formula (I) with at least one ethylenically unsaturated monomer corresponding to either unit (A) or (C) in formula (I).

Preferred monomers corresponding to unit (A) include acrylic acid, methacrylic acid, itaconic acid, and maleic acid. Preferred monomers corresponding to unit (C) include esters of acrylic and methacrylic acid, such as methyl acrylate, ethyl acrylate, propyl acrylate, butyl acrylate, methyl methacrylate, ethyl methacrylate, propyl methacrylate, and butyl methacrylate.

Thus, the polymerization medium can be water, methanol, ethanol, propanol, isopropanol, butanols, or even dimethylformamide, dimethylsulfoxide, tetrahydrofuran, acetone, methylethylketone, ethyl acetate, butyl acetate, hexane, heptane, benzene, toluene, ethylbenzene, xylene, mercaptoethanol, tert-iododecylmercaptan, thioglycolic acid and esters thereof, n-dodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, methyl chloride, monopropyleneglycol ether or diethyleneglycol ether.

The copolymers intended to be used as a compatibility, dispersion and grinding agent in accordance with the present invention are generally selected from among those having a specific viscosity of between 0.2 and 10.0 and preferably between 0.25 and 5.0, and most preferably between 0.4 and 1.2.

The specific viscosity of the copolymers, which is symbolized by the letter "$\eta$" was determined in the following manner:

A copolymer solution in sodium salt form was prepared by dissolving 50 g of dry copolymer in one liter of a solution of distilled water containing 60 g of sodium chloride.

Then, using a capillary viscometer placed in a 25° C. thermostatted bath, the flow time of a given volume of the above-identified solution containing the alkaline copolymer was measured, as was the flow time of the same volume of aqueous solution of sodium chloride without said copolymer. It was then possible to define the specific viscosity "$\eta$" using the following equation:

$$\eta = \frac{(\text{flow time of the copolymer solution}) - (\text{flow time of the NaCl solution})}{(\text{flow time of the NaCl solution})}$$

The capillary tube is generally selected such that the flow time of the NaCl solution without the copolymer is approximately 90 to 100 seconds, thus giving very accurate measurements of specific viscosity.

At the end of the polymerization, the acid copolymers in accordance with the invention in the aqueous solution are collected and can be used in this form.

In accordance with one alternative, which has been shown to be very interesting, the copolymers in accordance with the invention in the aqueous solution can be totally or partially neutralized by a neutralizing agent having a monovalent function. In addition, a neutralizing agent having a polyvalent function can be combined with this monovalent agent.

In the first case, the neutralizing agent is desirably selected from the group consisting of alkaline and similar cations, particularly lithium, sodium, potassium, ammonium or amine polysubstituted or not. This agent, in the second case, can be combined with an agent from the alkaline earth or similar group, preferably calcium and magnesium.

In practice, the liquid phase resulting from the copolymerization and containing the acid copolymer can be used in a salified form as a slurrying or grinding agent, but it can also be dried by any known means in order to remove said liquid and isolate the copolymer in the form of a fine powder and can be used in this other form as a compatibility, dispersion or grinding agent.

In another embodiment, the agent in accordance with the invention can be used in accordance with a method for the preparation of aqueous pigmentary suspensions, containing at least hydrated calcium sulfate, comprising the following steps:

a) The preparation by slurrying of an aqueous suspension of hydrated calcium sulfate, alone or mixed, is carried out under stirring by first placing all or part of the agent in accordance with the invention into the aqueous phase, and then introducing the pigment(s) so as to obtain a fluid and desirably homogeneous suspension;

b) The suspension prepared in accordance with step a) is continuously introduced into a grinding zone composed of a grinder with microelements;

c) The temperature of the suspension during grinding is kept at a level below 100° C. and preferably between room temperature and 80° C.;

d) The suspension is ground in the presence of the microelements for the time necessary to obtain the desired particle size;

e) During the grinding, an additional fraction of the agent is possibly introduced, in at least one step;

f) On exiting the grinder, the finely ground suspension of $CaSO_4.2H_2O$, alone or in a mixture, is continuously separated from the grinding elements and the particles which are rejected as being too coarse; and g) At least one rheology-modifying agent is possibly introduced into the finely ground suspension.

If the pigment or pigments used have a grain size distribution which conforms to the requirements of the user, only step a) is carried out. In the contrary case, the following steps are carried out, that is b) to g), so as to produce an aqueous suspension of pigments refined by grinding and rendered compatible with each other.

The agent in accordance with the invention is introduced into the aqueous pigmentary suspension in an amount of 0.05 to 4% by weight of active material in relation to the dry weight of the mineral materials, and preferably in an amount of 0.5 to 2.5%.

The suspension collected after the slurrying and/or the grinding generally has a concentration of at least 65% dry material, and preferably in the range of 70 to 80% by weight, with the size of the pigmentary particles obtained being defined by the user in the case of grinding.

The pigmentary suspension refined in this manner, due to the presence of the agent in accordance with the invention, can be preferably used as a pigmentary charge in the manufacture of paper, paint and plastic materials.

Other features of the invention will become apparent in the course of the following descriptions of exemplary embodiments which are given for illustration of the invention and are not intended to be limiting thereof.

EXAMPLES

EXAMPLE 1

This example, the object of which is to illustrate the effects of the known agents, relates to the preparation of a suspension of hydrated calcium sulfate using slurrying.

For this purpose, several suspensions of hydrated calcium sulfate were prepared with 19 types of known dispersion or compatibility agents.

All the suspensions (Tests 1 to 19) were carried out with the same calcium sulfate having an average grain size on the order of 15 micrometers, with the concentration of the suspensions being fixed at 68% by weight of dry material and the amount of the agent adjusted to 1% by weight of active material in relation to the pigmentary material.

The suspensions were prepared in the same apparatus as in step a) of the previously described method at room temperature.

The properties and results of Tests 1 to 19 are given in Table 1.

TABLE 1

Slurrying of $CaSO_4.2H_2O$ with Known Agents

| NUMBER | TYPE OF POLYMER | PERCENTAGE OF AGENT | CONCENTRATION OF THE SUSPENSION | AVERAGE DIAMETER OF PARTICLES IN MICROMETER | BROOKFIELD VISCOSITY after 24 hrs 10 REVS | 100 REVS |
|---|---|---|---|---|---|---|
| 1 | Sodium polyacrylate - Specific viscosity 0.40 | 1 | 68 | 15 | 2000 | 650 |
| 2 | Sodium polyacrylate - Specific viscosity 0.57 | 1 | 68 | 15 | 1800 | 700 |
| 3 | Sodium polyacrylate - Specific viscosity - 0.30 | 1 | 68 | 15 | 2700 | 770 |
| 4 | Sodium polyacrylate - Specific viscosity 0.70 | 1 | 68 | 15 | 3700 | 770 |
| 5 | Sodium polymethacrylate - Specific viscosity 0.55 | 1 | 68 | 15 | 18000 | 3900 |
| 6 | Chromium lignosulfonate | 1 | 68 | 15 | 10200 | 1600 |
| 7 | $C_6$-Alcohol phosphate monoester acid | 1 | 68 | 15 | 2100 | 800 |
| 8 | $C_{10}$-Alcohol phosphate monoester acid | 1 | 68 | 15 | 4100 | 1450 |
| 9 | $C_6$-Alcohol phosphate monoester sodium salt | 1 | 68 | 15 | SET IN MASS | |
| 10 | $C_{10}$-Alcohol phosphate sodium salt | 1 | 68 | 15 | SET IN MASS | |
| 11 | Calcium dodecyl benzenesulfonate + Sodium pyrophosphate | 0.6 0.4 | 68 | 15 | 8400 | 1680 |
| 12 | Sodium $C_{16}$-olefinsulfonate + Sodium pyrophosphate | 0.6 0.4 | 68 | 15 | 7200 | 950 |
| 13 | Carboxy methyl cellulose + $C_6$-Alcohol monoester phosphate acid | 0.6 0.4 | 68 | 15 | 8100 | 1120 |
| 14 | Carboxy methyl cellulose + $C_{10}$-Alcohol monoester phosphate acid | 0.6 0.4 | 68 | 15 | 10200 | 1700 |
| 15 | Ethylene glycol methacrylate monoester phosphate + Carboxy methyl cellulose | 0.6 0.4 | 68 | 15 | 7800 | 1080 |
| 16 | Oxyethyl 18-tristyrylphenol phosphate | 1 | 68 | 15 | 5300 | 920 |
| 17 | 2-methylpropanesulfonic acrylamide copolymer (30) Acrylic acid (37) Methacrylic acid (33) Specific viscosity: 0.4 | 1 | 68 | 15 | 9500 | 1540 |

TABLE 1-continued

| | | Slurrying of CaSO$_4$.2H$_2$O with Known Agents | | | | |
|---|---|---|---|---|---|---|
| | | | | AVERAGE DIAMETER OF PARTICLES IN MICROMETER | BROOKFIELD VISCOSITY after 24 hrs | |
| NUMBER | TYPE OF POLYMER | PERCENTAGE OF AGENT | CONCENTRATION OF THE SUSPENSION | | 10 REVS | 100 REVS |
| 18 | Itaconic acid copolymer (15) Methacrylic acid (40) Acrylic acid (45) Specific viscosity: 0.4 | 1 | 68 | 15 | 10800 | 2700 |
| 19 | Phosphonic salt (Dequest 160 from Monsanto) 0.4 + Copolymer No. 18 | 1 | 68 | 15 | 8000 | 950 |

Table 1 demonstrates that the viscosities at 10 and 100 revolutions are fairly high for a monopigment, in certain cases resulting in setting.

EXAMPLE 2

This example, which is intended to illustrate the object of the invention, relates to the slurrying of hydrated calcium sulfate (of the same origin as in Example 1) in the presence of the agent in accordance with the invention in the case where the copolymer does not contain monomer (C) (that is $M=0$).

Through Tests 20 to 29, the formula of the copolymer was modified by qualitatively and quantitatively varying the various radicals as well as the specific viscosities of the copolymers used, it being understand that said copolymers had been at least partially salified with sodium cations until a pH of between 7 and 8 on average was obtained.

The properties of the suspensions prepared (Tests 20 to 29) and the results obtained are collected in Table 2.

TABLE 2

Slurrying of $CaSO_4.2H_2O$ According to the Present Invention

| Example No | A | | | B | | | | | C | | | Specific Viscosity | Percentage of Agent | Concentration of the suspension (%) | Average Diameter of the Particles (micrometers) | Brookfield Viscosity after 24 hrs (cP) | |
|---|---|---|---|---|---|---|---|---|---|---|---|---|---|---|---|---|---|
| | R1 | R2 | M1 | k | R3 | R4 | R5 | R6 | M2 | l | R7 R8 R9 | m | | | | | 10 rev | 100 rev |
| 20 | H | H | Na | 90 | H | CH₃ | O=C—OCH₂CH₂O | Na | Na/H | 10 | | 0 | 0.65 | 1 | 68 | 15 | 800 | 520 |
| 21 | H | H | Na | 85 | H | CH₃ | O=C—OCH₂CH₂O | Na | Na/H | 15 | | 0 | 0.58 | 1 | 68 | 15 | 200 | 170 |
| 22 | H | H | Na | 85 | H | H | O=C—OCH₂CH₂O | Na | Na/H | 15 | | 0 | 0.74 | 1 | 68 | 15 | 800 | 440 |
| 23 | H | H | Na | 70 | H | CH₃ | O=C—OCH₂CH₂O | Na | Na/H | 30 | | 0 | 0.76 | 0.3 | 68 | 15 | 850 | 600 |
| 24 | H | H | Na | 70 | H | CH₃ | O=C—OCH₂CH₂O | Na | Na/H | 30 | | 0 | 0.5 | 0.4 | 68 | 15 | 1050 | 750 |
| 25 | H | H | Na | 60 | H | CH₃ | O=C—OCH₂CH₂O | Na | Na/H | 40 | | 0 | 0.56 | 0.1 | 68 | 15 | 950 | 485 |
| 26 | H | H | Na | 50 | H | CH₃ | O=C—OCH₂CH₂O | Na | Na/H | 50 | | 0 | 0.43 | 0.1 | 68 | 15 | 800 | 400 |
| 27 | H | CH₃ | Na | 60 | H | CH₃ | O=C—OCH₂CH₂O | Na | Na/H | 40 | | 0 | 0.41 | 0.1 | 68 | 15 | 850 | 420 |
| 28 | H CH₃ | H CH₃ | Na Na | 45 15 | H | CH₃ | O=C—OCH₂CH₂O | Na | Na/H | 40 | | 0 | 0.51 | 0.1 | 68 | 15 | 750 | 360 |
| 29 | H | H | Na | 20 | H H | CH₃ H | O=C—OCH₂CH₂O O=C—OCH₂CH₂O | Na | Na/H | 40 | | 0 | Insoluble | 0.1 | 68 | 15 | 720 | 320 |

From Table 2 and the comparison with Table 1, it is apparent that the viscosities of the suspensions in accordance with the invention measured under the same conditions as those of Example 1 are considerably lower than obtainable by the known agents. Therefore, it was possible to lower the concentration of compatibility agent by large amounts, possibly by a ratio of 10/1.

EXAMPLE 3

This example, which is intended to illustrate the object of the invention, relates to the slurrying of hydrated calcium sulfate (of the same origin as in Example 1) in the presence of the agent in accordance with the invention, in the case where the copolymer does not contain monomer (A) (that is $K=0$).

Through Tests 30 to 35, the formula of the copolymer was modified by qualitatively and quantitatively varying the various radicals as well as the specific viscosities of the copolymers used, it being understand that said copolymers had been at least partially salified with the sodium cation until a pH of between 7 and 8 on average was obtained.

The properties of the suspensions prepared (Tests 30 to 35) and the results obtained are collected in Table 3.

TABLE 3

Slurrying of CaSO$_4$.2H$_2$O According to the Present Invention

| Example No | A R1 | R2 | M1 | k | R3 | R4 | B R5 | R6 | M2 | l | R7 | R8 | C R9 | m | Specific Viscosity | Percentage of Agent | Concentration of the suspension (%) | Average Diameter of the Particles (micrometers) | Brookfield Viscosity after 24 hrs (cP) 10 rev | 100 rev |
|---|---|---|---|---|---|---|---|---|---|---|---|---|---|---|---|---|---|---|---|---|
| 30 | | | | 0 | H | CH$_3$ | O=C—OCH$_2$CH$_2$O | Na | Na/H | 40 | H | H | C—NH$_2$ (=O) | 60 | | 1 | 68 | 15 | 650 | 430 |
| 31 | | | | 0 | H | CH$_3$ | O=C—OCH$_2$CH$_2$O | Na | Na/H | 30 | H | H / CH$_3$, OCH$_3$ | CO(CH$_2$)$_2$OH | 45 / 25 | | 1 | 68 | 15 | 500 | 310 |
| 32 | | | | 0 | H | CH$_3$ | — | Na | Na/H | 40 | H | H | C—NH$_2$ (=O) | 60 | 0.6 | 0.5 | 68 | 15 | 1040 | 420 |
| 33 | | | | 0 | H | CH$_3$ | — | Na | Na/H | 40 | H | CH$_3$ | C—CH$_2$—CH$_2$OH (=O) | 60 | 0.55 | 0.5 | 68 | 15 | 950 | 320 |
| 34 | | | | 0 | H | CH$_3$ | — | Na | Na/H | 40 | H | { H / CH$_3$ } | { C—NH$_2$ (=O) / C—OCH$_3$ (=O) } | { 45 / 15 } | 0.7 | 0.5 | 68 | 15 | 1000 | 405 |
| 35 | | | | 0 | H | H | C—NH—C(CH$_3$)$_2$—CH$_2$—CH$_3$ (=O) | Na | Na/H | 30 | H | H | C—NH$_2$ (=O) | 70 | 0.65 | 1 | 68 | 15 | 900 | 560 |

From Table 3 and the comparison with Table 1, it is apparent that the viscosities of the suspensions in accordance with the present invention, measured under the same conditions as those of Example 1, are considerably lower than obtainable by the known agents. Therefore, it was possible to lower the concentration of compatibility agent by large amounts, possibly by a ratio of 2/1.

EXAMPLE 4

This example, which is intended to illustrate the object of the invention, relates to the slurrying of hydrated calcium sulfate (of the same origin as in Example 1) in the presence of the agent in accordance with the invention, in the case where the copolymer prepared contains the three monomers (A), (B) and (C), that is when K and M are simultaneously not equal to 0.

Through Tests 36 to 60, the formula of the copolymer was modified by qualitatively and quantitatively varying the various radicals as well as the specific viscosities of the copolymers used, it being understand that said copolymers had been at least partially salified with the sodium cation until a pH of between 7 and 8 on average was obtained.

The properties of the suspensions prepared (Tests 36 to 60) and the results obtained are collected in Table 4.

TABLE 4

Slurrying of CaSO₄·2H₂O According to the Present Invention

| Example No | A R1 | R2 | M1 | k | R3 | B R4 | R5 | R6 | M2 | l | R7 | R8 | C R9 | m | Specific Viscosity | Percentage of Agent | Concentration of suspension (%) | Average Diameter of the Particles (micrometers) | Brookfield Viscosity after 24 hrs (cp) 10 rev | 100 rev |
|---|---|---|---|---|---|---|---|---|---|---|---|---|---|---|---|---|---|---|---|---|
| 36 | H | H | Na | 70 | H | CH₃ | O=C—OCH₂CH₂—O | Na | Na/H | 15 | H | CH₃ | C—OCH₃, C=O | 15 | 0.46 | 0.5 | 68 | 15 | 910 | 630 |
| 37 | H | H | Na | 65 | H | CH₃ | O=C—OCH₂CH₂—O | Na | Na/H | 20 | H | CH₃ | C—OCH₃, C=O | 15 | 0.5 | 0.5 | 68 | 15 | 840 | 560 |
| 38 | H | H | Na | 55 | H | CH₃ | O=C—OCH₂CH₂—O | Na | Na/H | 30 | H | CH₃ | C—OCH₃, C=O | 15 | 0.66 | 0.3 | 68 | 15 | 680 | 340 |
| 39 | H | H | Na | 40 | H | CH₃ | O=C—OCH₂CH₂—O | Na | Na/H | 30 | H | CH₃ | C—OCH₃, C=O | 30 | 0.6 | 0.3 | 68 | 15 | 600 | 320 |
| 40 | H | H | Na | 45 | H | CH₃ | O=C—OCH₂CH₂—O | Na | Na/H | 40 | H | CH₃ | C—OCH₃, C=O | 15 | 0.54 | 0.1 | 68 | 15 | 710 | 450 |
| 41 | H | H | Na | 55 | H | H | O=C—OCH₂CH₂—O | Na | Na/H | 15 | H | CH₃ | C—OCH₃, C=O | 30 | 0.55 | 0.5 | 68 | 15 | 1020 | 730 |
| 42 | H | H | Na | 30 | H | H | O=C—OCH₂CH₂—O | Na | Na/H | 40 | H | CH₃ | C—OCH₃, C=O | 30 | 0.53 | 0.3 | 68 | 15 | 700 | 440 |
| 43 | H | CH₃ | Na | 45 | H | CH₃ | O=C—OCH₂CH₂—O | Na | Na/H | 40 | H | CH₃ | C—OCH₃, C=O | 15 | 0.49 | 0.2 | 68 | 15 | 680 | 470 |
| 44 | H | H | Na | 45 | H | CH₃ | O=C—OCH₂CH₂—O | Na | Na/H | 40 | H | H | C—NH₂, C=O | 15 | 0.60 | 0.1 | 68 | 15 | 780 | 510 |
| 45 | H | H | Na | 45 | H | CH₃ | O=C—OCH₂CH₂—O | Na | Na/H | 40 | H | H | C—NHCH₂OH, C=O | 15 | 0.55 | 0.1 | 68 | 15 | 820 | 550 |
| 46 | H | H | Na | 55 | H | CH₃ | O=C—OCH₂CH₂—O | Na | Na/H | 30 | H | H | CO(CH₂)₂—CH₃ | 15 | 0.52 | 0.2 | 68 | 15 | 920 | 500 |

TABLE 4-continued

Slurrying of $CaSO_4 \cdot 2H_2O$ According to the Present Invention

| Example No | A | | | | | | B | | | | C | | | m | Specific Viscosity | Percentage of Agent | Concentration of the suspension (%) | Average Diameter of the Particles (micrometers) | Brookfield Viscosity after 24 hrs (cp) 10 rev | 100 rev |
|---|---|---|---|---|---|---|---|---|---|---|---|---|---|---|---|---|---|---|---|---|
| | R1 | R2 | M1 | k | R3 | R4 | R5 | | R6 | M2 | l | R7 | R8 | R9 | | | | | | | |
| 47 | H | H | Na | 50 | H | $CH_3$ | $\underset{C-OCH_2CH_2-O}{\overset{O}{\parallel}}$ | | Na | Na/H | 40 | H | H | $\underset{-(CH_2)_{11}-CH_3}{C-O-(CH_2CH_2O)_4}$ | 10 | 0.50 | 0.4 | 68 | 15 | 840 | 530 |
| 48 | H | H | Na | 45 | H | $CH_3$ | $\underset{C-OCH_2CH_2O}{\overset{O}{\parallel}}$ | | Na | Na/H | 40 | H | H | CN | 15 | 0.56 | 0.2 | 68 | 15 | 780 | 470 |
| 49 | H | H | Na | 45 | H | $CH_3$ | $\underset{C-OCH_2CH_2O}{\overset{O}{\parallel}}$ | | Na | Na/H | 40 | H | $CH_2COCH$ | COCH | 15 | 0.55 | 0.3 | 68 | 15 | 720 | 510 |
| 50 | H | H | Na | 45 | H | $CH_3$ | $\underset{C-OCH_2CH_2O}{\overset{O}{\parallel}}$ | | Na | Na/H | 40 | H | $-CH_3$ | $\underset{\underset{CH_3}{\overset{\oplus}{CH_3-N-CH_3}} Cl^{\ominus}}{\overset{O}{\underset{COCH_2-CH_2}{\parallel}}}$ | 15 | 0.48 | 0.2 | 68 | 15 | 690 | 450 |
| 51 | H | H | Na | 45 | H | $CH_3$ | $\underset{C-OCH_2CH_2O}{\overset{O}{\parallel}}$ | | Na | Na/H | 40 | H | H | $C_6H_5$ | 15 | 0.7 | 0.1 | 68 | 15 | 850 | 540 |
| 52 | H | H | Na | 45 | H | $CH_3$ | — | | Na | Na/H | 40 | H | $CH_3$ | $\underset{\overset{\parallel}{O}}{C-OCH_3}$ | 15 | 0.65 | 0.1 | 68 | 15 | 750 | 520 |
| 53 | H | H | Na | 45 | H | $CH_3$ | $\underset{C-O(CH_2CH_2O)_3}{\overset{O}{\parallel}}$ | | Na | Na/H | 40 | H | $CH_3$ | $\underset{\overset{\parallel}{O}}{C-OCH_3}$ | 15 | 0.7 | 0.4 | 68 | 15 | 910 | 620 |
| 54 | H | H | Na | 45 | H | H | $-CH_2O-$ | | Na | Na/H | 40 | H | $CH_3$ | $\underset{\overset{\parallel}{O}}{C-OCH_3}$ | 15 | 0.8 | 0.4 | 68 | 15 | 880 | 590 |
| 55 | H | H | Na | 45 | H | $C_6H_5$ | — | | Na | Na/H | 40 | H | $CH_3$ | $\underset{\overset{\parallel}{O}}{C-OCH_3}$ | 15 | Insoluble | 0.3 | 68 | 15 | 780 | 460 |
| 56 | H | H | Na | 45 | H | H | $\underset{C-NH-C-CH_2}{\overset{O}{\underset{CH_3}{\overset{CH_3}{\parallel}}}}$ | | Na | Na/H | 40 | H | $CH_3$ | $\underset{\overset{\parallel}{O}}{C-OCH_3}$ | 15 | 0.68 | 0.4 | 68 | 15 | 900 | 600 |

TABLE 4-continued

Slurrying of CaSO$_4$.2H$_2$O According to the Present Invention

| Example No | A R1 | R2 | M1 | k | R3 | R4 | R5 | B | R6 | M2 | l | R7 | R8 | C R9 | m | Specific Viscosity | Percentage of Agent | Concentration of the suspension (%) | Average Diameter of the Particles (micrometers) | Brookfield Viscosity after 24 hrs (cp) 10 rev | 100 rev |
|---|---|---|---|---|---|---|---|---|---|---|---|---|---|---|---|---|---|---|---|---|---|
| 57 | H | H | Na | 55 | O=C—OH | H | O=C—O—CH$_2$—C(CH$_3$)=O | | Na | Na/H | 30 | H | CH$_3$ | C(=O)—OCH$_3$ | 15 | 0.50 | 0.4 | 68 | 15 | 850 | 540 |
| 58 | O=C—OH | H | Na | 45 | H | CH$_3$ | O=C—OCH$_2$CH$_2$O | | Na | Na/H | 40 | H | CH$_3$ | C(=O)—OCH$_3$ | 15 | 0.75 | 0.3 | 68 | 15 | 930 | 625 |
| 59 | H | H | Na | 45 | H | CH$_3$ | O=C—OCH$_2$CH$_2$O | | Na | Na/H | 40 | H | H | 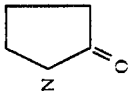 | 15 | 0.5 | 0.3 | 68 | 15 | 720 | 440 |
| 60 | H | H | Na | 45 | H | CH$_3$ | O=C—OCH$_2$CH$_2$O | | Na | Na/H | 40 | O=C—OH | H | O=C—OCH$_3$ | 15 | 0.58 | 0.6 | 68 | 15 | 970 | 640 |

From Table 4 and the comparison with Table 1, it is apparent that the viscosities of the suspensions in accordance with the present invention, measured under the same conditions as those of Example 1, are considerably lower than obtainable by the known agents. Therefore, it was possible to lower the concentration of compatibility agent by large amounts, possibly by a ratio of 10/1.

EXAMPLE 5

This example, which is intended to illustrate the object of the present invention, relates to the slurrying of hydrated calcium sulfate (of the same origin as in Example 1) in the presence of the agent in accordance with the invention, copolymer with the formula described in Example 4 and with a specific viscosity varying from 0.27 to 2.5 and salified with the sodium cation.

In this case, several tests were carried out (Tests 40/01 to 40/10), with the aqueous suspensions of hydrated calcium sulfate subjected to slurrying in the presence of said agent in an amount of 0.1% by weight of dry material in relation to the weight of the dry pigment, with the concentration of the suspension always being fixed at 68% by weight of said sulfate.

The properties of the suspensions prepared (Tests 40/01 to 40/10) and the results obtained are collected in Table 5.

TABLE 5

Influence of the Specific Viscosity of the Agent on the Rheology of the Pigmentary Suspension

| Test No. | Specific Viscosity | Brookfield Viscosity after 24 hours (in cP) | |
|---|---|---|---|
| | | 10 rpm | 100 rpm |
| 40/01 | 0.27 | 1330 | 910 |
| 40/02 | 0.45 | 850 | 520 |
| 40/03 | 0.5 | 840 | 485 |
| 40/04 | 0.54 | 710 | 450 |
| 40/05 | 0.6 | 700 | 410 |
| 40/06 | 0.7 | 650 | 370 |
| 40/07 | 0.76 | 630 | 340 |
| 40/08 | 0.9 | 750 | 460 |
| 40/09 | 1.17 | 900 | 540 |
| 40/10 | 2.5 | 1250 | 830 |

From Table 5 and the comparison with Table 1, it is apparent that the viscosities of the suspensions in accordance with the present invention, measured under the same conditions as those of Example 1, are considerably lower than obtainable by the known agents, even within the claimed limits of specific viscosities.

Therefore, it was possible in all cases to lower the concentration of compatibility agent by a ratio of 10/1.

EXAMPLE 6

This example, which is intended to illustrate the object of the present invention, relates to the slurrying of the same hydrated calcium sulfate used in the preceding examples in the presence of the agent composed of a copolymer with the same specific viscosity and with the same composition but salified with sodium, lithium, ammonium, potassium, calcium and magnesium, or in an acid form, or salified by an amine.

In this case, several tests were carried out (Tests 61 to 69), with the aqueous suspensions subjected to slurrying in the presence of said agent having concentrations of dry material which were fixed at 68% by weight and the amount of the agent being fixed at 0.1% by weight of dry material.

The properties of the suspensions prepared (Tests 61 to 69) and the results obtained are collected in Table 6.

TABLE 6

Slurrying of CaSO$_4$,2H$_2$O According to the Present Invention

| Example No | A | | | | | B | | | | C | | | Specific Viscosity | Percentage of Agent | Concentration of the suspension (%) | Average Diameter of the Particles (micrometers) | Brookfield Viscosity after 24 hrs (cP) | |
|---|---|---|---|---|---|---|---|---|---|---|---|---|---|---|---|---|---|---|
| | R1 | R2 | M1 | k | R3 | R4 | R5 | R6 | M2 | l | R7 | R8 | R9 | m | | | | 10 rev | 100 rev |
| 61 | H | H | Na | 45 | H | CH$_3$ | O=C—OCH$_2$CH$_2$O | Na | Na/H | 40 | H | CH$_3$ | O=C—OCH$_3$ | 15 | 0.54 | 0.1 | 68 | 15 | 710 | 450 |
| 62 | H | H | NH$_4$ | 45 | H | CH$_3$ | O=C—OCH$_2$CH$_2$O | NH$_4$ | NH$_4$/H | 40 | H | CH$_3$ | O=C—OCH$_3$ | 15 | 0.54 | 0.1 | 68 | 15 | 820 | 490 |
| 63 | H | H | K | 45 | H | CH$_3$ | O=C—OCH$_2$CH$_2$O | K | K/H | 40 | H | CH$_3$ | O=C—OCH$_3$ | 15 | 0.54 | 0.1 | 68 | 15 | 1200 | 790 |
| 64 | H | H | Li | 45 | H | CH$_3$ | O=C—OCH$_2$CH$_2$O | Li | Li/H | 40 | H | CH$_3$ | O=C—OCH$_3$ | 15 | 0.54 | 0.1 | 68 | 15 | 650 | 400 |
| 65 | H | H | Ca | 45 | H | CH$_3$ | O=C—OCH$_2$CH$_2$O | Ca | Ca/H | 40 | H | CH$_3$ | O=C—OCH$_3$ | 15 | 0.54 | 0.1 | 68 | 15 | 1800 | 950 |
| 66 | H | H | NaMg | 45 | H | CH$_3$ | O=C—OCH$_2$CH$_2$O | Na/Mg | Na/Mg/H | 40 | H | CH$_3$ | O=C—OCH$_3$ | 15 | 0.54 | 0.1 | 68 | 15 | 1600 | 920 |
| 67 | H | H | TEA | 45 | H | CH$_3$ | O=C—OCH$_2$CH$_2$O | TEA | TEA/H | 40 | H | CH$_3$ | O=C—OCH$_3$ | 15 | 0.54 | 0.1 | 68 | 15 | 1560 | 880 |
| 68 | H | H | H | 45 | H | CH$_3$ | O=C—OCH$_2$CH$_2$O | H | H | 40 | H | CH$_3$ | O=C—OCH$_3$ | 15 | 0.54 | 0.1 | 68 | 15 | 1100 | 720 |
| 69 | H | H | Na | 45 | H | CH$_3$ | O=C—OCH$_2$CH$_2$O | Na | Na | 40 | H | CH$_3$ | O=C—OCH$_3$ | 15 | 0.54 | 0.1 | 68 | 15 | 700 | 430 |

From Table 6 and the comparison with Table 1, it is apparent that the viscosities of the suspensions in accordance with the present invention are considerably lower than obtainable by the known agents, even though the concentration of the compatibility agent was decreased by a ratio of 10/1.

particular the viscosities of the suspensions at 10 and 100 revolutions per minute.

TABLE 7-1

Properties of the Suspensions Used in Table 7-2

| Suspension of: | Agent | | Concentration % | Suspension Average diameter (microns) | Brookfield Viscosity (cP) | |
|---|---|---|---|---|---|---|
| | Type | | | (%) | 10 rpm | 100 rpm |
| CaCO3 H 90 from OMYA Co. | A | Sodium polyacrylate Specific viscosity: 0.55 | 0.4 | 75 | 1 | 700 | 300 |
| CaSO4.2H2O | B1 | Polyacrylate Specific viscosity: 0.6 | 1 | 70 | 15 | 2700 | 980 |
| | B2 | Agent of the invention Test 40/07 | 1 | 70 | 15 | 200 | 150 |
| SPS kaolin from ECC | C | Sodium polyacrylate Specific viscosity: 0.40 | 0.2 | 66 | 3.5 | 600 | 300 |
| AT1 titanium from Thann and Mulhouse | D | Sodium and calcium polyacrylate Specific viscosity: 0.4 | 0.35 | 73 | 0.5 | 6600 | 1200 |

The mixtures of the suspensions were prepared by adjusting the amount of agent to 1%:
- for the prior art with sodium polyacrylate with a specific viscosity of 0.55
- for the invention with 40/07.

EXAMPLE 7

The object of this example is to compare the compatibility of aqueous polypigmentary suspensions containing two pigments, at least one of which is hydrated calcium sulfate, for coating paper, using a known compatibility agent (Table 7-2, Tests 70 to 79) and an agent in accordance with the present invention (Table 7-2, Tests 80 to 88).

For this purpose, aqueous monopigmentary suspensions of calcium carbonate, hydrated calcium sulfate, kaolin, and titanium oxide in the presence of a known compatibility agent (types A, B1, C, and D) and an agent in accordance with the present invention (type B2) with similar specific viscosities were prepared by slurrying.

The characteristics of the aqueous pigmentary suspensions prepared in this manner and the results obtained are collected in Table VII-1 below, indicating in Then, in order to compare the efficacy of the compatibility agents used, the preparation of aqueous polypigmentary suspensions was carried out by mixing the above-identified suspensions of calcium carbonate, kaolin, and titanium oxide with the hydrated calcium sulfate suspensions.

The properties of the polypigmentary suspensions prepared in this manner and the results obtained from the experiments are provided in Table 7-2.

TABLE 7-2

Test for Compatibility by Mixing

| | Test number | Dry extract (%) | % by weight of the mixture of the suspensions | | | | Brookfield viscosity of the mixture (in cP) | |
|---|---|---|---|---|---|---|---|---|
| | | | of CaCO3 A | of CaSO4.2H2O B2 | B1 | of titanium D | of kaolin C | 10 rpm | 100 rpm |
| PRIOR ART | 70 | 74.5 | 90 | | 10 | 0 | 0 | Set in mass | |
| | 71 | 74 | 80 | | 20 | 0 | 0 | " | |
| | 72 | 73.5 | 70 | | 30 | 0 | 0 | 48000 | 7200 |
| | 73 | 66.4 | 0 | | 10 | 0 | 90 | Set in mass | |
| | 74 | 66.8 | 0 | | 20 | 0 | 80 | " | |
| | 75 | 67.2 | 0 | | 30 | 0 | 70 | " | |
| | 76 | 67.6 | 0 | | 40 | 0 | 60 | 100000 | 10000 |
| | 77 | 68 | 0 | | 50 | 0 | 50 | 75000 | 10000 |
| | 78 | 72.7 | | | 10 | 90 | 0 | Set in mass | |
| | 79 | 72.4 | 0 | | 20 | 80 | 0 | Set in mass | |
| INVENTION | 80 | 66.4 | 0 | 10 | | 0 | 90 | 33000 | 5200 |
| | 81 | 66.8 | 0 | 20 | | 0 | 80 | 16000 | 3500 |
| | 82 | 67.2 | 0 | 30 | | 0 | 70 | 6200 | 1300 |
| | 83 | 74.5 | 90 | 10 | | 0 | 0 | 35000 | 4000 |
| | 84 | 74 | 80 | 20 | | 0 | 0 | 22000 | 2840 |
| | 85 | 73.5 | 70 | 30 | | 0 | 0 | 14000 | 2000 |
| | 86 | 72.7 | 0 | 10 | | 90 | 0 | 6250 | 815 |
| | 87 | 72.4 | 0 | 20 | | 80 | 0 | 2700 | 460 |
| | 88 | 72.1 | 0 | 30 | | 70 | 0 | 1600 | 295 |

Table 7-2 leads to the following observations. The hydrated calcium sulfate, due to its greater solubility in the aqueous medium, is the pigment which generates the shock effect during the preparation of polypigmentary suspensions. However, it should be recalled that for the coating of the paper, it is the polypigmentary suspensions with a low content of hydrated calcium sulfate which are used and which have been shown to be the most sensitive to the shock effect.

For Tests 70 to 79, which represent the effect of known agents to which the invention is compared, the polypigmentary suspensions, obtained by mixing, practically all manifest setting during the mixing of the constituent suspensions. These results reveal the inability of the known compatibility agents to overcome the shock effect caused by the hydrated calcium sulfate.

For Tests 80 to 88, which illustrate the present invention, the polypigmentary suspensions obtained by mixing all have a reasonably decreased viscosity, rendering them suitable to use for the coating of paper. The phenomenon observed of the substantial lowering of the viscosities shows the ability of the present compatibility agent to overcome the shock effect caused by the hydrated calcium sulfate. Therefore, the present compatibility agent enables the preparation of polypigmentary suspensions containing hydrated calcium sulfate with concentrations of dry material which are adequate for papermaking applications.

All the above results were able to be compared by using identical dry extracts, percentages of compatibility agent and identical amounts of pigmentary mixtures for both the known agents and the present agents.

EXAMPLE 8

The object of this example is to illustrate, in a comparative manner, the ability of the present agent to be the compatibility, the dispersion, and the grinding agent simultaneously.

For this purpose, coarse suspensions of hydrated calcium sulfate from the same origin were prepared by using known compatibility agents (Tests 89 to 92) and compatibility agents according to the present invention (Tests 93 to 98).

Known Compatibility Agents
Test 89: sodium polyacrylate.
Test 90: sodium polymethacrylate.
Test 91: copolymer of acrylic acid and methallyl sulfonate neutralized with the sodium ion.
Test 92: copolymer of acrylic acid and dimethylaminoethyl methacrylate neutralized with the sodium ion.

Compatibility Agents From the Present Invention
Test 93: copolymer of acrylic acid and ethylene glycol methacrylate phosphate neutralized with the sodium ion.
Test 94: copolymer of methyl methacrylate, ethylene glycol methacrylate phosphate and acrylic acid neutralized with the sodium ion.
Test 95: copolymer of ethylene glycol methacrylate phosphate, ethylene glycol acrylate phosphate and acrylic acid neutralized with the sodium ion.

Test 96: copolymer of ethylene glycol methacrylate phosphate, ethylene glycol acrylate phosphate and methyl methacrylate neutralized with the sodium ion.
Test 97: copolymer of ethylene glycol methacrylate phosphate, acrylic acid and acrylamide neutralized with the sodium ion.
Test 98: copolymer of methyl methacrylate, ethylene glycol methacrylate phosphate and acrylic acid neutralized with the lithium ion.

The average diameter of the hydrated calcium sulfate before grinding was 15 micrometers.

These tests were all carried out using the same experimental procedures, carrying out the grinding in the same apparatus, in order that the results obtained could be directly compared.

For each test, an aqueous suspension of hydrated calcium sulfate with an average diameter of 15 micrometers was prepared.

The aqueous suspension had a concentration of 68% of dry material expressed as a percentage by weight.

The grinding agent was present in the suspensions in an amount of 1% by weight of dry material in relation to the mass of hydrated calcium sulfate to be ground.

Each suspension prepared in this manner was placed in a Dyno-Mill type grinder with a fixed cylinder and a rotating impeller, the grinding body of which was composed of corundum bearings of a diameter in the range of 0.6 millimeter to 1.0 millimeter.

The total volume occupied by the grinding body was 5,000 milliliters, while its weight was 10 kilograms.

The grinding chamber had a volume of 5,000 milliliters. The circumference speed of the grinder was 10 meters per second.

The hydrated calcium sulfate suspension was recycled at a rate of 50 liters per hour.

The exit of the Dyno-Mill grinding was provided with a 300 micron mesh separator, enabling the separation of the suspension resulting from the grinding and the grinding body.

The temperature during each grinding test was maintained at 25° C.

At the end of the grinding, the viscosity of the microparticulate suspension was measured using a Brookfield viscosimeter, at a temperature of 20° C. and at rotation speeds of 10 and 100 revolutions per minute.

Similarly, at the end of the grinding, the grain size was determined using a Cilas Alcatel 715 laser granulometer.

The properties of the ground suspensions and the results obtained after grinding are given in Table 8.

TABLE 8

|  | Test number | Composition of the agent | Specific viscosity | Grain size Average diameter (in microns) | Brookfield viscosity (in cP) | |
|---|---|---|---|---|---|---|
|  |  |  |  |  | 10 rpm | 100 rpm |
| PRIOR ART | 89 | 100% AA neutralized 100% Na | 0.55 | 8 | 17000 | 2700 |
|  | 90 | 100% AMA neutralized 100% Na | 0.5 | 9 | 18000 | 3980 |
|  | 91 | 85% AA neutralized 100% Na 15% MTAS | 0.4 | 9 | 12500 | 2300 |
|  | 92 | 50% AA neutralized 100% Na 50% MADAM | 0.4 | 8 | 16500 | 2600 |
| INVENTION | 93 | 70% AA neutralized 100% Na 30% PO$_4$MAEG | 0.76 | 5 | 6000 | 1000 |
|  | 94 | 15% MAM neutralized 100% Na 40% PO$_4$MAEG 45% AA | 0.76 | 3 | 7500 | 1120 |
|  | 95 | 40% PO$_4$MAEG neutralized 100% Na 40% PO$_4$AEG 20% AA | 0.6 | 4 | 10000 | 1480 |
|  | 96 | 40% PO$_4$MAEG neutralized 100% Na 40% PO$_4$AEG | 0.74 | 5 | 9500 | 1300 |

TABLE 8-continued

| Test number | Composition of the agent | Specific viscosity | Grain size Average diameter (in microns) | Brookfield viscosity (in cP) | |
|---|---|---|---|---|---|
| | | | | 10 rpm | 100 rpm |
| 97 | 20% MAM<br>40% PO$_4$MAEG neutralized 100% Na<br>45% AA | 0.62 | 4 | 7800 | 1100 |
| 98 | 15% Acrylamide<br>15% MAM Neutralized<br>40% PO$_4$MAEG    100% Li<br>45% AA | 0.76 | 3 | 7000 | 950 |

The results given in Table 8 lead to the following observations. For Tests 89 to 92 which represent suspensions of hydrated calcium sulfate ground in the presence of known compatibility agents, it is seen that the average diameter of the ground pigment remains coarse and that the viscosity of the suspensions obtained is high. Thus, these suspensions are unsuitable for papermaking applications.

For Tests 93 to 98 which represent suspensions of hydrated calcium sulfate ground in the presence of the compatibility agent of the present invention, it is observed that the average diameter of the ground pigment is very fine and that the viscosity of the suspensions obtained is much lower than that obtained by the prior art, even with the consequent decrease in the average diameter.

The favorable development of these two characteristics renders the present suspensions particularly suitable for papermaking applications.

EXAMPLE 9

The object of this example is to illustrate the capability of the present compatibility agent to enable the grinding of aqueous polypigmentary suspensions containing a pigmentary mixture of hydrated calcium sulfate and calcium carbonate.

For this purpose, mixed suspensions of coarse hydrated calcium sulfate (average diameter of 15 micrometers) and coarse calcium carbonate (average diameter of 30 micrometers) were prepared using a known compatibility agent (Tests 99 to 101) and a compatibility agent in accordance with the present invention (Tests 102 to 104).

Each aqueous suspension had a concentration of 70% by weight of dry material, with the composition of the pigmentary mixture being prepared according to the ratios indicated in Table 9 and the compatibility agent being present in an amount of 1% by weight of dry material in relation to the dry pigments.

The grinding tests were carried out using the same experimental procedures as those described in Example 8.

The properties of the ground suspensions and the results obtained after grinding are given in Table 9.

TABLE 9

| | Test number | Type of agent | Percentage of agent | Average diameter after grinding | CaSO$_4$.2H$_2$O | CaCO$_3$ | Viscosity after grinding | |
|---|---|---|---|---|---|---|---|---|
| | | | | | | | 10 revs. | 100 revs. |
| PRIOR ART | 99 | Sodium polyacrylate | 1 | GRINDING | 70 | 30 | GRINDING | |
| | 100 | Specific viscosity 0.55 | 1 | | 50 | 50 | | |
| | 101 | | 1 | IMPOSSIBLE | 30 | 70 | IMPOSSIBLE | |
| INVENTION | 102 | AGENT OF THE | 1 | 1.3 | 70 | 30 | 14000 | 1320 |
| | 103 | INVENTION | 1 | 1.4 | 50 | 50 | 14000 | 1600 |
| | 104 | TEST 40-07 | 1 | 1.5 | 30 | 70 | 6000 | 1160 |

The results given in Table 9 lead to the following observations: For Tests 99 to 101 which represent the aqueous polypigmentary suspensions using known agents, grinding is impossible due to the rapid increase in viscosity until a paste state is reached.

For Tests 102 to 104 which represent the aqueous polypigmentary suspensions in accordance with the present invention, it can be seen that the average diameter of the two types of ground pigments is very close to one micrometer, revealing not only a remarkable improvement in relation to the pigmentary suspensions of the prior art but also in relation to the ground monopigmentary suspensions of Example 8. In addition, the viscosities after grinding of said suspensions remain reasonable, even low, in spite of the increased fineness of the co-ground pigments.

EXAMPLE 10

The object of this example is to illustrate the compatibility between pigments which are different in composition when they are used together in an aqueous polypigmentary suspension, due to the presence of the present agent.

For this purpose, monopigmentary suspensions of calcium carbonate and hydrated calcium sulfate were first prepared by grinding in an aqueous medium (using the procedures of Example 8) in the presence of a known compatibility agent (suspension types E and G) and an agent in accordance with the present invention (suspension types F and H). The properties of the monopigmentary suspensions and the results obtained are given in Table 10-1.

TABLE 10-1

| Reference | Properties of the Suspensions of Table 10-2 | | | |
|---|---|---|---|---|
| | Suspension of $CaCO_3$ | | Suspension of $CaSO_4.2H_2O$ | |
| | E | F | G | H |
| Type of agent | Sodium polyacrylate | Agent of the invention. Test 40/07 | Sodium polyacrylate | Agent of the invention. Test 40/07 |
| Specific viscosity | 0.55 | 0.76 | 0.55 | 0.76 |
| Concentration of the suspension (%) | 75 | 75 | 68 | 68 |
| Average diameter (microns) | 1 | 1.5 | 8 | 3 |
| Brookfield viscosity of the suspensions (cP) | 10 rpm 700 / 100 rpm 300 | 10 rpm 3000 / 100 rpm 1200 | 10 rpm 17000 / 100 rpm 2700 | 10 rpm 7500 / 100 rpm 1170 |

In order to comparatively test the efficacy of the compatibility agents, the preparation of aqueous polypigmentary suspensions was carried out by mixing suspensions of calcium carbonate and hydrated calcium sulfate, containing on the one hand the known compatibility agent and on the other hand the compatibility agent in accordance with the present invention.

Tests 105 to 108 represent the suspensions with known agents and Tests 109 to 112 represent those of the present agent.

The properties of the polypigmentary suspensions prepared and the results obtained collected in Table 10-2.

TABLE 10-2

| | Test No. | Dry extract of the mixture (%) | % by wt. of the mixture of suspensions | | | | Brookfield viscosity (in cP) | |
|---|---|---|---|---|---|---|---|---|
| | | | $CaCO_3$ | | $CaSO_4.2H_2O$ | | | |
| | | | E | F | G | H | 10 rpm | 100 rpm |
| Prior Art | 105 | 74.3 | 90 | 0 | 10 | 0 | 75000 | >10000 |
| | 106 | 73.6 | 80 | 0 | 20 | 0 | 62000 | >10000 |
| | 107 | 72.9 | 70 | 0 | 30 | 0 | 45000 | >10000 |
| | 108 | 72.2 | 60 | 0 | 40 | 0 | 37000 | 8000 |
| Invention | 109 | 74.3 | 0 | 90 | 0 | 10 | 3000 | 740 |
| | 110 | 73.6 | 0 | 80 | 0 | 20 | 1600 | 360 |
| | 111 | 72.9 | 0 | 70 | 0 | 30 | 400 | 230 |
| | 112 | 72.2 | 0 | 60 | 0 | 40 | 280 | 200 |

The results given in Table 10-2 lead to the following observations. For tests 105 to 108, the known compatibility agent does not eliminate the interpigmentary shock effect during the mixing of the monopigmentary suspensions: the viscosities of the known agent-containing polypigmentary suspensions are exacerbated to the extreme with the occurrence of a pasty appearance.

For Tests 109 to 112, the present compatibility agent eliminates the interpigmentary shock effect during the mixing of the monopigmentary suspensions; the viscosities of said polypigmentary suspensions are very low, even lower than those observed in Table 7-2 of Example 7 (polypigmentary suspensions obtained by mixing unground monopigmentary suspensions).

EXAMPLE 11

The object of this example is to illustrate the capability of hydrated calcium sulfate to be substituted as a pigment for titanium oxide in a polypigmentary suspension, in the coating of paper, due to the presence of the agent in accordance with the present invention.

For this purpose, two aqueous polypigmentary suspensions were prepared: one containing kaolin, calcium carbonate, and titanium oxide dispersed in the aqueous phase by means of a known compatibility agent; the other containing kaolin, calcium carbonate and hydrated calcium sulfate dispersed in the aqueous phase by means of the present compatibility agent.

To these aqueous polypigmentary suspensions, the various components were added which were necessary for their transformation into paper-coating formulas, with the components being introduced in identical amounts so that the two formulas could be distinguished from one another only by the presence of $TiO_2$ in one, and by the presence of hydrated calcium sulfate and the compatibility agent of the present invention in the other.

These two formulas were used for coating a cardboard on a flat table machine built by the Allimand company.

Using a trailing blade, a coat of 11 to 12 g.m$^{-2}$ of each formula was deposited on a cardboard support (170 g.m$^{-2}$) at an application speed of 380 meters per minute in a width of 3.2 meters. At the exit of the Allimand machine, a coated cardboard of 181 to 182 g.m$^{-2}$ was obtained.

The properties of the coating formulas and the coated cardboards are given in Table 11.

TABLE 11

| Coating Formulas and Industrial Tests | | |
|---|---|---|
| Kaolin from the ECC Company | 65 | 65 |
| $CaCO_3$ Hydrocarb 90 from OMYA | 25 | 25 |
| $TiO_2$ RL 68 from Thann and Mulhouse | 10 | 0 |
| $CaSO_4.2H_2O$ | 0 | 10 |
| Compatability agent of the invention 40/07; addition | 0 | 4% in dry/dry in relation to the sulfate |
| CMC Finnfix 5 (water retainer) from Metralliiton Tilisuus | 0.5% on dry pigment | 0.5% on dry pigment |
| Acrylic styrene latex SD 215 from Rhone Poulenc | 15% | 15% |
| Urecoll S (rendering the layer | 10% in | 10% in |

TABLE 11-continued

| Coating Formulas and Industrial Tests | | |
|---|---|---|
| insoluble) from BASF | relation to the dry latex | relation to the dry latex |
| NaOH. quantity sufficient for a pH of: | 8.5-8.7 | 8.5-8.7 |
| Water, quantity sufficient for a dry extract of: | 65% | 65% |
| Leucophor CK bluing agent from Sandoz | 1% as is on the dry pigment | 1% as is on the dry pigment |
| Brookfield          revs. | 7600 | 6000 |
| viscosity     100 revs. | 1280 | 1000 |
| Whiteness | 84.5 | 89.7 |
| Brilliance under ultraviolet | 29 | 27 |
| Pause opacity index | −0.8 | −0.85 |
| Ink absorption - Drying time | 12/15 seconds | 4/5 seconds |
| Behavior on the machine | Slight clogging of the blade | Perfectly smooth blade |

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A copolymer having the formula (I):

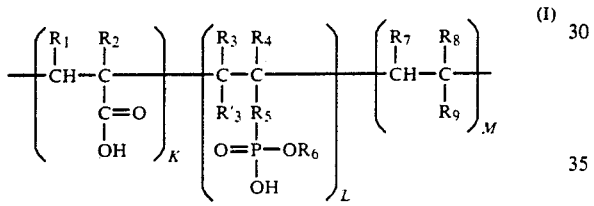

symbolized by the formula: $+A)_K+B)_L+C)_M$ wherein (B) is an ethylene unit having a phosphate or phosphonate group, (A) is an ethylene unit having a carboxylic acid group, and (C) is an ethylene unit which may have an ester group, and wherein L is a value such that the amount of (B) is between 5 and 95 parts by weight, based on the total amount of (A), (B), and (C), one of K and M may be 0 and the sum of K, L, and M equals 100 parts by weight;

wherein $R_1$ is one member selected from the group consisting of hydrogen and a carboxylic acid group which may be esterified with a $C_1$ to $C_{12}$ alkyl group;

$R_2$ is one member selected from the group consisting of hydrogen and $C_1-C_{12}$ alkyl;

$R_3$ and $R'_3$ are each, independently, one member selected from the group consisting of hydrogen, a carboxylic acid group, halogen, $C_1-C_{12}$ alkyl, and substituted or unsubstituted aryl;

$R_4$ is one member selected from the group consisting of hydrogen, $C_1-C_{12}$ alkyl, substituted or unsubstituted aryl, and a carboxylic acid group which may be esterified with a $C_1-C_{12}$ alkyl group;

$R_5$ is one member selected from the group consisting of an ester group, a substituted amide, oxygen, $C_1-C_{12}$ alkylene, substituted or unsubstituted arylene, substituted or unsubstituted cycloalkylene, substituted or unsubstituted cycloalkenylene and substituted or unsubstituted aralkylene, an ethylene or propylene oxide carboxylic ester of the formula:

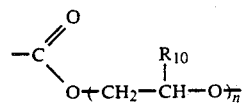

in which $R_{10}$ is hydrogen or methyl and n has a value of between 1 and 50, an alkyl, aryl, or aralkyl carboxylic ester of the formula:

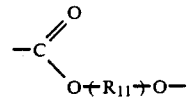

wherein $R_{11}$ contains 1 to 12 carbon atoms, and a substituted amide of the formula:

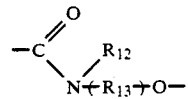

wherein $R_{12}$ is hydrogen, $C_1-C_{12}$ alkyl, substituted or unsubstituted aryl, or aralkyl, and $R_{13}$ is $C_1-C_{12}$ alkylene, substituted or unsubstituted arylene, substituted or unsubstituted cycloalkylene, substituted or unsubstituted cycloalkenylene, or substituted or unsubstituted aralkylene;

$R_6$ is one member selected from the group consisting of hydrogen, a cation, an amine, $C_1-C_3$ alkyl, substituted or unsubstituted aryl, substituted or unsubstituted cycloalkyl, substituted or unsubstituted cycloalkenyl, substituted or unsubstituted aralkyl, a $C_1-C_{12}$ ester, and a substituted amide;

$R_7$ is one member selected from the group consisting of hydrogen, a carboxylic acid group, a $C_1-C_{12}$ ester, $C_1-C_{12}$ alkyl, aryl, cycloalkyl, cycloalkenyl, and aralkyl;

$R_8$ is one member selected from the group consisting of hydrogen, a carboxylic acid group, $C_1-C_3$ alkyl, and halogen; and $R_9$ is one member selected from the group consisting of a $C_1-C_{12}$ ester, substituted or unsubstituted amide, $C_1-C_{12}$ alkyl, cycloalkyl, cycloalkenyl, aryl, aralkyl, halogen, $-CO_2H$, and a sulfonated or sulfated alkyl or aryl group.

2. The copolymer of claim 1, wherein said copolymer is prepared by copolymerizing, at atmospheric or reduced pressure, in the presence of an initiator, regulator, and an aqueous, alcoholic, hydroalcoholic, aromatic aliphatic or halogenated solvent medium, an ethylenically unsaturated monomer which corresponds to unit (B) and an ethylenically unsaturated monomer which corresponds to unit (A) or unit (B).

3. The copolymer of claim 2, wherein said polymerization medium is selected from the group consisting of water, methanol, ethanol, propanol, isopropanol, butanols, dimethylformamide, dimethylsulfoxide, tetrahydrofuran, acetone, methylethylketone, ethyl acetate, butyl acetate, hexane, heptane, benzene, toluene, ethylbenzene, xylene, mercaptoethanol, tertiododecylmercaptan, thioglycolic acid and esters thereof, n-dodecylmercaptan, acetic acid, tartaric acid, lactic acid, citric acid, gluconic acid, glucoheptonic acid, 2-mercaptopropionic acid, thiodiethanol, carbon tetrachloride, chloroform, methylene chloride, methyl chloride, monopropyleneglycol ether or diethyleneglycol ether.

4. The copolymer of claim 1, wherein said copolymer has a specific viscosity of between 0.2 and 10.0.

5. The copolymer of claim 1, which is in the acid form.

6. The copolymer of claim 1, wherein said copolymer is at least partially neutralized with a neutralizing agent having a monovalent function.

7. The copolymer of claim 6, wherein said neutralizing agent is selected from the group consisting of lithium, sodium, potassium, ammonium, and substituted ammonium.

8. The copolymer of claim 6, wherein said monovalent neutralizing agent is combined with a polyvalent neutralizing agent.

9. The copolymer of claim 8, wherein said polyvalent neutralizing agent is selected from the group consisting of alkaline earth metals.

* * * * *

UNITED STATES PATENT AND TRADEMARK OFFICE
CERTIFICATE OF CORRECTION

PATENT NO. : 5,109,090

DATED : APRIL 28, 1992

INVENTOR(S) : JACQUES MONGOIN ET AL

It is certified that error appears in the above-identified patent and that said Letters Patent is hereby corrected as shown below:

Column 8, Table 1, under the column "100 REVS", Number 4, "770" should read --1300--.

Column 30, Table 7-2, Test No. 78, column of "$CaCO_3$", insert --0--.

Column 37, Table 11, third column, fourth line from bottom, "-0.85" should read -- -8.65--.

Signed and Sealed this

Twenty-second Day of March, 1994

Attest:

BRUCE LEHMAN

Attesting Officer

Commissioner of Patents and Trademarks